US009174538B2

(12) United States Patent
Zawade et al.

(10) Patent No.: US 9,174,538 B2
(45) Date of Patent: Nov. 3, 2015

(54) DEVICE AND METHOD FOR ACTIVATING AND/OR DEACTIVATING FUNCTIONS OF A VEHICLE

(75) Inventors: Torsten Zawade, Peine (DE); Rainer Santelmann, Langlingen (DE); Heiko Pabst Von Ohain, Shanghai (CN)

(73) Assignee: VOLKSWAGEN AG, Wolfsburg (DE)

( * ) Notice: Subject to any disclaimer, the term of this patent is extended or adjusted under 35 U.S.C. 154(b) by 1304 days.

(21) Appl. No.: 12/301,207

(22) PCT Filed: May 11, 2007

(86) PCT No.: PCT/EP2007/004169
§ 371 (c)(1),
(2), (4) Date: Jan. 26, 2009

(87) PCT Pub. No.: WO2007/131710
PCT Pub. Date: Nov. 22, 2007

(65) Prior Publication Data
US 2009/0312917 A1 Dec. 17, 2009

(30) Foreign Application Priority Data

May 16, 2006 (DE) .......................... 10 2006 022 692

(51) Int. Cl.
*B60K 37/06* (2006.01)
(52) U.S. Cl.
CPC ....................................... *B60K 37/06* (2013.01)
(58) Field of Classification Search
USPC ............. 701/48, 51, 52, 53, 37, 1, 36, 58, 70, 701/93, 94, 95; 307/10.1; 477/3
See application file for complete search history.

(56) References Cited

U.S. PATENT DOCUMENTS

| 5,640,056 | A | * | 6/1997 | Setzer et al. ................. 307/10.1 |
| 6,895,318 | B1 | * | 5/2005 | Barton et al. .................... 701/42 |
| 7,299,120 | B2 | * | 11/2007 | Serebrennikov ................ 701/67 |
| 7,344,475 | B2 | | 3/2008 | Pelchen et al. |
| 7,937,201 | B2 | * | 5/2011 | Roudeau et al. ................. 701/51 |
| 2002/0165655 | A1 | * | 11/2002 | Hellmann et al. .............. 701/93 |

(Continued)

FOREIGN PATENT DOCUMENTS

| DE | 195 03 920 | 8/1996 |
| DE | 199 63 468 | 7/2001 |

(Continued)

OTHER PUBLICATIONS

International Search Report, International Application No. PCT/EP2007/004169, dated Sep. 20, 1997(English-language translation provided).

*Primary Examiner* — Karen Beck
(74) *Attorney, Agent, or Firm* — Kenyon & Kenyon LLP

(57) ABSTRACT

At least two functions provided in an off-road operation of a vehicle are activated or deactivated by a single operation of a control device. The feedback regarding the activated overall functionality takes place via the display device, which may be provided as backlit symbol in the control device. The functions to be activated or deactivated are driver assistance on downhill grades in the form of a downhill driving restriction, flat accelerator pedal characteristic map, either power take-off function for a manual transmission or gear step preselection function for an automatic transmission, navigation display function, instrument cluster display function, driving light activation function, and automatic parking brake function.

25 Claims, 3 Drawing Sheets

(56) References Cited

U.S. PATENT DOCUMENTS

| | | |
|---|---|---|
| 2003/0200016 A1 | 10/2003 | Spillane et al. |
| 2005/0004732 A1 | 1/2005 | Berry et al. |
| 2005/0021211 A1* | 1/2005 | Guenthner et al. ............ 701/93 |
| 2005/0064987 A1* | 3/2005 | Budal et al. ....................... 477/3 |
| 2005/0065703 A1* | 3/2005 | Assaf et al. ..................... 701/93 |
| 2006/0047400 A1* | 3/2006 | Prakash et al. ................. 701/70 |
| 2006/0287794 A1* | 12/2006 | Gianoglio et al. ............. 701/53 |
| 2007/0083316 A1* | 4/2007 | Kurz et al. ...................... 701/93 |
| 2007/0192009 A1* | 8/2007 | Braeuchle et al. ............. 701/70 |
| 2008/0035444 A1* | 2/2008 | Schiele et al. ............. 192/219.5 |
| 2008/0093916 A1* | 4/2008 | Negoro ............................. 303/3 |
| 2008/0139363 A1* | 6/2008 | Williams ...................... 477/111 |
| 2009/0233757 A1* | 9/2009 | Soliman et al. ................... 477/3 |
| 2009/0233758 A1* | 9/2009 | Soliman et al. ................... 477/3 |
| 2010/0094513 A1* | 4/2010 | Mair ............................... 701/48 |
| 2013/0018559 A1* | 1/2013 | Epple et al. ..................... 701/70 |

FOREIGN PATENT DOCUMENTS

| | | |
|---|---|---|
| DE | 100 44 955 | 4/2002 |
| DE | 100 64 937 | 7/2002 |
| DE | 102 38 126 | 3/2004 |
| DE | 103 45 485 | 4/2005 |
| DE | 10 2004 020 110 | 11/2005 |
| DE | 10 2004 040 829 | 3/2006 |
| EP | 1 028 011 | 8/2000 |
| EP | 1 355 209 | 10/2003 |
| EP | 1 445 130 | 8/2004 |
| WO | WO 03/058359 | 7/2003 |

\* cited by examiner

DEVICE AND METHOD FOR ACTIVATING AND/OR DEACTIVATING FUNCTIONS OF A VEHICLE

FIELD OF THE INVENTION

The present invention relates to a device and a method for activating and/or deactivating functions of a vehicle, in particular a vehicle having all-wheel drive, using an operating device.

BACKGROUND INFORMATION

A control device having a multi-functional control switch is described in German Published Patent Application No. 195 03 920. An operator can variably select controllable functional elements from among a totality of functional elements. In one specific embodiment, the control switch, which is realized in the form of a tunnel switch, can operate different functionalities, such as a window lifter, sliding roof, lower headlight beam, air recirculation operation, etc.

German Published Patent Application No. 102 38 126 describes a method for controlling a drive train of a vehicle for the purpose of operating a multi-assembly transmission in an off-road vehicle in a highly efficient manner. In the process, the transmission ratio in the range group is automatically varied in an operational or shifting strategy superposed to the actually activated shifting program, while an advantageous counter-shift takes place in the automatic transmission in order to minimize the difference in engine speeds between the range group and the automatic transmission.

German Published Patent Application No. 100 44 955 describes a commercial vehicle, which is operable as off-road vehicle and equipped with an electric auxiliary drive for one axle; in a low speed range, the electric drive can be connected as a power take-off aid, either manually via a switch or automatically via signals from the vehicle computer.

All mentioned documents provide the driver with technical solutions by which the driving characteristics of the vehicles are controlled via inputs with the aid of a control device to the effect that the comfort or the efficiency is increased or else additional traction support is applied. However, they do not actively assist the driver in the manifold and often difficult to accomplish driving tasks that confront the driver of an off-road vehicle during off-road driving.

SUMMARY

Example embodiments of the present invention provide a device and/or a method for activating and/or deactivating functions provided for an off-road operation of the vehicle with the least possible distraction of the driver from monitoring the traffic.

The device and the method may be utilized to assist the driver in the safe and reliable operation in areas without paved roads as a function of the driven speed and the terrain-specific conditions. With the aid of a single operator action of the multi-functional operating device, it is therefore possible to control a plurality of different functionalities that are beneficial in off-road driving.

In example embodiments of the present invention, the control device for activating and/or deactivating the at least two functions provided for an off-road operation of the vehicle is disposed centrally in the center console or on the steering wheel or in the vicinity of the steering wheel of the vehicle. In addition, a display device for displaying the activation and/or deactivation of the functions provided for off-road operation may be provided.

Such functions made available for off-road operation are, for example, a method for driver assistance on roads having a downhill gradient, and/or a method for switching to an accelerator pedal characteristic map intended for off-road stretches, and/or a method for automatic activation of a parking brake, and/or a method for activation and/or deactivation of the driving lights, and/or the switchover of a display of a display device provided in the vehicle, in particular the instrument cluster, to off-road operation. In a vehicle having gear shift, a power-take-off function is also able to be activated and/or deactivated simultaneously via the control device. In a vehicle having automatic transmission, a method for preselecting drive position settings of the transmission may be provided in addition.

According to example embodiments of the present invention, the activation of the at least two functions provided for off-road operation is implementable in a speed range of up to approximately 50 km/h, e.g., up to approximately 40 km/h, for example, up to approximately 30 km/h.

Example embodiments of the present invention are explained in greater detail below with reference to the appended Figures.

DETAILED DESCRIPTION

Figure 1:
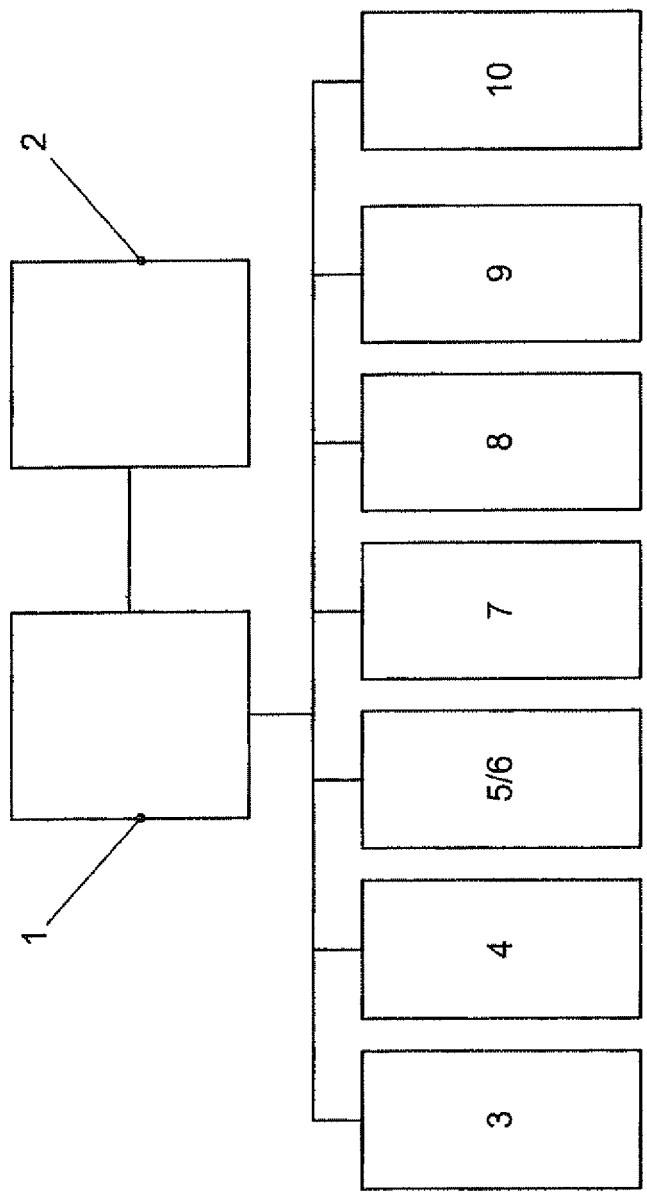
FIG. 1 is a block diagram of the device according to an example embodiment of the present invention for the uncluttered illustration of the various activatable functions.
Figure 2:
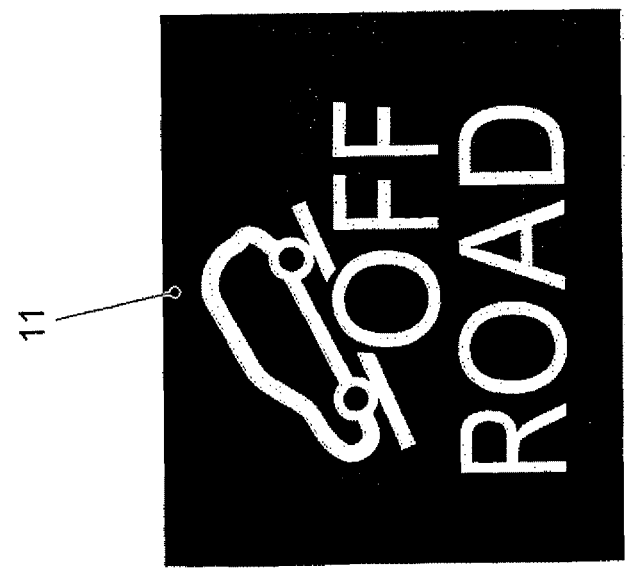
FIG. 2 is an illustration of a symbol on the control device and/or on a display device for the off-road function.
Figure 4:
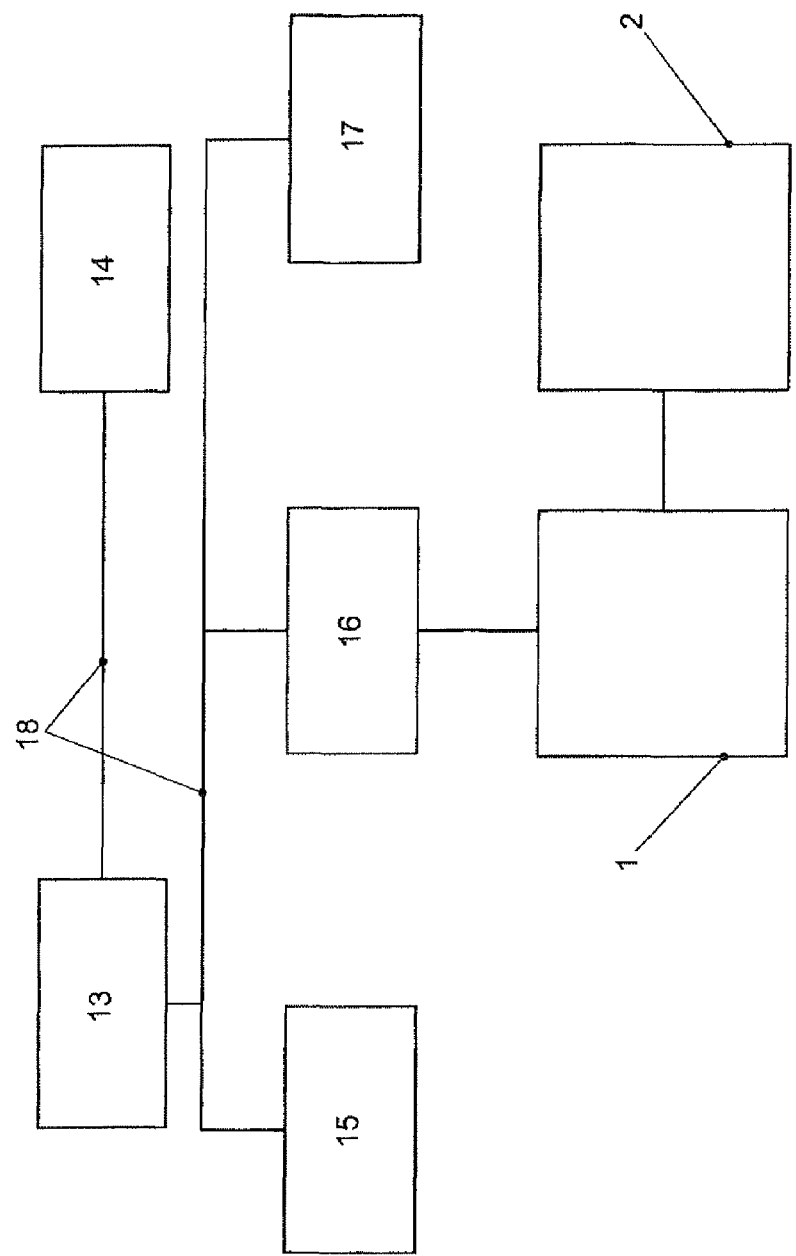
FIG. 4 is a system diagram of the device according to an example embodiment of the present invention, to illustrate the interaction with the individual control devices.

The functionality of the device according to an example embodiment of the present invention as illustrated in FIG. 1 is activated by operating control device 1 with the aid of a pushbutton in the center console. The feedback regarding the activated overall functionality takes place via display device 2, which may be provided as a backlit symbol, FIG. 2, on pushbutton switch 1, which is switched on without noticeable delay once the pushbutton has been depressed. When the function is active, the symbol, FIG. 2, is backlit in yellow on pushbutton 1; when the function is deactivated, the symbol, FIG. 2, will not appear on pushbutton 1 or it will be backlit in red; and red when the control element illumination is switched on. Different variants and colors or color changes are possible. The deactivation of the overall function takes place by renewed activation of pushbutton 1 or also when the ignition is turned off. Once the ignition is switched on, the overall function is basically deactivated and must be activated anew by pressing the pushbutton in case activation is desired. The yellow backlighting of the pushbutton symbol, FIG. 2, is turned off without noticeable delay when the overall function is deactivated, regardless of possibly still active sub-functionalities; in some cases the sub-functions are turned off via ramps in order to achieve a soft deactivation. The illumination of the functions of the sub-functions remains activated until these functions have been turned off completely, e.g., during the switch-off via a ramp. The yellow function illumination, FIG. 2, of the control device is part of the diagnosis cycle; when an error occurs, e.g., a defective light or a short-circuit, the overall function will be deactivated for the duration of the current driving cycle. If the function is no longer activatable due to a fault in the function illumination, the driver receives no feedback but merely notices that pressing the pushbutton elicits no response. The distribution of the master functionality of the sub-functions to individual control devices is illustrated in FIG. 4. The control of power-takeoff assistance function 5, as well as the flat accelerator-pedal characteristics map function takes place via engine-control device 16. Automatic-transmission gear-preselection function 6 is transmitted to transmission-control device 17 via engines control device 16 and data bus 18. Downhill-driving restriction function 4 is transmitted to ESP control device 15 via engine-control device 16 and data bus 18. Via data bus 18 and gateway 13, corresponding operating states are able to be optically displayed with the aid of a display device such as instrument cluster 14, for example.

The following functions or functionalities are jointly activated or deactivated by operating control device 1:

Flat Accelerator Pedal Characteristic Map 3

Flat accelerator pedal characteristic map 3 is intended to provide a finer adjustment of the accelerator pedal at low speeds. Once the overall function of operating device 1 has been activated, the accelerator pedal characteristic map will be modified only when the accelerator pedal is no longer being operated. The modification of the accelerator pedal value takes place as a function of the selected gear and the engine speed. After the overall function has been deactivated by pressing the pushbutton, the accelerator pedal characteristic map is switched to the original value once the accelerator pedal is no longer being operated, or via a ramp function. As soon as the ignition is turned off, the accelerator pedal characteristic map is reset to the original value without delay.

Downhill Driving Regulation 4

Figure 3:
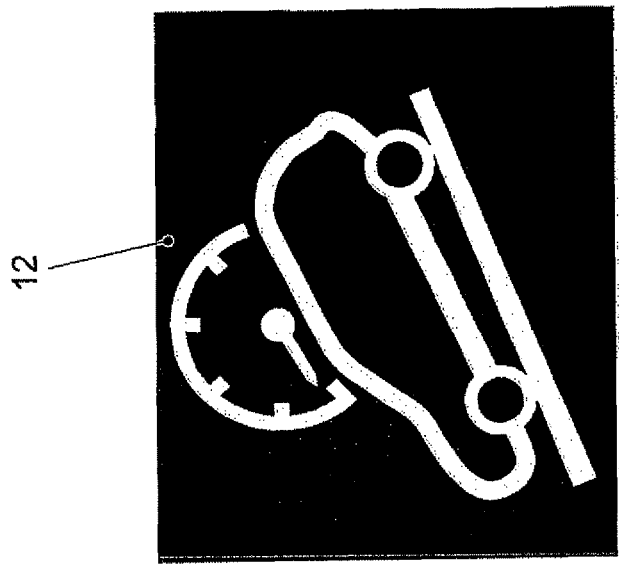
FIG. 3 is an illustration of a symbol for the downhill driving control on the instrument cluster.

The sub-function of downhill driving regulation 4 is intended to provide simple controllability of driving in off-road vehicles without special off-road gear reduction in overrun operation on steep downhill grades. Downhill driving regulation 4 restricts the speed on a downhill grade by an active braking intervention and is implemented only if the combustion engine is running and if the vehicle speed is below a specific threshold value. Downhill driving regulation 4 triggers the braking operation as soon as the speed in downhill driving in trailing throttle operation exceeds a specific limit in a walking-speed range; locking of the wheels is avoided when the anti-lock control system is active. Downhill driving regulation 4 reduces the vehicle speed to close to walking speed and keeps it constant; the driver is able to increase the speed via the accelerator pedal or to reduce it via the brake pedal at all times. When the overall function is deactivated during an active braking intervention, the pressure reduction takes place only at the end of instantaneous downhill driving regulation 4 or via a suitable ramp in order to avoid an unexpected "break-out" of the vehicle on the downhill grade. According to the exemplary embodiment, the display (FIG. 3) of the activation of downhill driving regulation 4 for an active braking intervention is implemented by a control display on the instrument cluster using a symbol that is backlit in green. In the event that the brake is actuated, the control display blinks; if no braking intervention is taking place, the control display on the instrument cluster is turned off and thus not visible. If the overall function of the operating device is deactivated, the control display, FIG. 3, on the instrument cluster continues to blink for the duration of an active brake intervention; this also occurs if the function feedback for the overall functionality is switched off in operating device 1.

Power-Takeoff Assistance for a Vehicle Model Having Manual Transmission 5

Power-takeoff assistance 5 is meant to assist the driver when starting to drive, e.g., during an uphill standing-start operation or when pulling a trailer. When the accelerator pedal is depressed completely, an optimum engine-specific power take-off engine speed is set automatically, so that the only task facing the driver is the operation of the clutch pedal. Power take-off assistance 5 reduces clutch wear caused by very high rotational speed when the clutch is sliding, and it also simplifies the operating sequence since the driver has to focus only on operating the clutch. Once the overall function of operating device 1 has been activated, the power take-off assistance will be activated only if the vehicle is at a standstill or rolling slowly, With an activated power take-off assistance 5, the engine speed is restricted to an optimum engine-specific power take-off speed, even when the accelerator pedal is fully depressed. This restriction to a maximum engine speed remains active during the power take-off phase and will be deactivated again only when a threshold value for the vehicle speed has been exceeded. The deactivation of the engine speed restriction by exceeding the speed threshold or by operating control device 1 takes place via a ramp in order to prevent a load reversal. Once the power take-off assistance has been deactivated by exceeding the speed threshold, the function remains in a waiting state and will automatically be activated again once the vehicle comes to a standstill or is rolling slowly. Separate visual and/or acoustic feedback of the activation of the power takeoff assistance is optional.

Automatic Transmission Gear Ratio Preselection 6

Sub-function 6 of gear ratio preselection pertains to vehicle models having automatic transmission and causes better utilization of the engine braking effect in the automatic shift gate by raising the engine speed level and by an attendant later upshifting of individual drive positions. When activating overall function 6 via control device 1, downshifting takes place in drive positions "D" and "S" if a lower gear is specified for the instantaneous vehicle state for the vehicle velocity and engine speed in the off-road mode; this raises the engine speed. When overall function 6 is activated via control device 1, no forced upshifting occurs in the touch shift control, and the engine speed is reduced at the engine speed limit. In contrast to the normal behavior in the touch shift control, no automatic shifting to the higher gear occurs once the maximum engine speed has been reached; the transition to off-road operation takes place in a smooth manner so that a direct effect is not perceived as jarring. A correspondingly designed switch-off strategy upon deactivation of the control device prevents the vehicle from "breaking out".

Switchover of the Navigation Display to Off-Road Operation 7

The evaluation via the navigation device takes place via data bus signal 17 "control device activated" (FIG. 4). Once the off-road functionality is activated via control device 1, the compass will be superimposed on the navigation display. The display of the compass may be faded out and a different menu point be selected by activating the control device of the navigation device. While the route guidance of the navigation system is activated, the display will not be switched to the compass but instead the display of the route guidance remains superposed on the navigation display.

Display of Off-Road Operation on Instrument Cluster 8 (Without Navigation Device)

Once the off-road functionalities have been activated via control device 1, the compass is superposed on the display of instrument cluster 8. By activating operating devices, the display of the compass may be faded out and a different menu point be selected. While the off-road functionality is active, the compass display can be superposed again at any time by operating the control device.

Driving Light Activation 9

The function of switching on the driving lights when control device 1 is actuated is intended to avoid hazardous situations, e.g., provide better visibility vis-à-vis others. The activation of function 9—automatic switching on of the driving lights—by control device 1 takes place only if the light switch is in an auxiliary driving light position. When the off-road functionality is activated, the parking lights, tail light, low headlight beam, license-plate lights as well as the instrument illumination or switch illumination are switched on in this switch position. The lights are turned on independently of the signal from a possibly provided light sensor. The lights are turned off as soon as the off-road functionality is deactivated via control device 1 as well; exceptions occur only if the light sensor gives the appropriate signal to turn the driving lights on or if the daylight running lights are activated in the vehicle. When the position of the rotary light switch is changed from the auxiliary driving light position to another switch position, the known responses will be implemented regardless of the status of the off-road functionality. When the rotary light switch is in the "Off" position, all lights are off.

Automatic Parking Brake 10

Automatic parking brake sub-function 10 keeps the vehicle stopped when it is at a standstill or during a power take-off. A detailed description of the method of functioning can be found in German Published Patent Application No. 103 45 485, for example. Once the overall function of control device 1 has been activated, the vehicle is automatically held whenever it stops, so that the driver need not additionally concentrate on operating the parking brake. The display of the activation takes place via an operating element by which the automatic parking brake is switched into its operational state.

LIST OF REFERENCE NUMERALS

1 control device
2 display device
3 flat accelerator pedal characteristic map function
4 downhill driving restriction function
5 power take-off assistance function
6 automatic transmission gear preselection function
7 navigation display function
8 instrument cluster display function
9 driving light activation function
10 automatic parking brake function
11 symbol, off-road pushbutton on display device
12 symbol, downhill driving regulation on display device
13 gateway
14 instrument cluster
15 ESP control device
16 engine control device
17 transmission control device
18 data bus

What is claimed is:

1. A device, comprising:
a control device adapted to (a) jointly activate and (b) jointly deactivate at least two functions provided in an off-road operation of a vehicle;
wherein during joint deactivation, the control device is configured to deactivate at least one of the at least two functions via a ramp function.

2. The device according to claim 1, wherein the vehicle is arranged as an all-wheel drive vehicle.

3. The device according to claim 1, wherein the at least two functions include a function for driver assistance on downhill grades and a switchover to an accelerator pedal characteristic map provided for off-road stretches.

4. The device according to claim 1, wherein one of the functions is a function for power-takeoff assistance in a vehicle having a manual transmission.

5. The device according to claim 1, wherein one of the functions is a function for preselecting transmission steps of a vehicle having an automatic transmission.

6. The device according to claim 1, wherein one of the functions is a function for switching a navigation functionality to off-road operation on a display.

7. The device according to claim 1, wherein one of the functions is a function for display of the off-road operation on an instrument cluster.

8. The device according to claim 1, wherein one of the functions is a function for activating driving lights.

9. The device according to claim 1, wherein one of the functions is a function for automatic activation of a parking brake.

10. The device according to claim 1, wherein the activation of the at least two functions is implementable in a speed range of at least one of: (a) up to approximately 50 km/h; (b) up to approximately 40 km/h; and (c) up to approximately 30 km/h.

11. The device according to claim 1, wherein the control device includes a pushbutton.

12. The device according to claim 1, wherein the control device is arranged centrically in a center console of the vehicle.

13. The device according to claim 1, further comprising a display device adapted to display at least one of (a) the activation and (b) the deactivation of the at least two functions.

14. The device according to claim 13, wherein the display device is integrated within the control device.

15. A method, comprising:
(a) jointly activating and (b) jointly deactivating, via a control device, at least two functions provided in an off-road operation of a vehicle;
wherein during the jointly deactivating, at least one of the at least two functions is deactivated via a ramp function.

16. The method according to claim 15, wherein the vehicle is arranged as an all-wheel drive vehicle.

17. The method according to claim 15, wherein the functions include a function for driver assistance on downhill grades and a switchover to an accelerator pedal characteristic map provided for off-road stretches.

18. The method according to claim 15, wherein one of the functions is a function for power-takeoff assistance of a vehicle having a manual transmission.

19. The method according to claim 15, wherein one of the functions is a function for preselecting transmission steps of a vehicle having an automatic transmission.

20. The method according to claim 15, wherein one of the functions is a function for switching a navigation functionality to off-road operation on a display.

21. The method according to claim 15, wherein one of the functions is a function for displaying the off-road operation on an instrument cluster.

22. The method according to claim 15, wherein one of the functions is a function for activating driving lights.

23. The method according to claim 15, wherein one of the functions is a function for automatic activation of a parking brake.

24. The method according to claim 15, wherein the activation of the at least two functions is implementable in a speed range of at least one of: (a) up to approximately 50 km/h; (b) up to approximately 40 km/h; and (c) up to approximately 30 km/h.

25. The method according to claim 15, further comprising displaying at least one of (a) the activation and (b) the deactivation via a display device.

* * * * *